United States Patent [19]
Wier

[11] Patent Number: 6,094,913
[45] Date of Patent: Aug. 1, 2000

[54] BELT TIGHTENER FOR A SAFETY BELT SYSTEM

[75] Inventor: Franz Wier, Göggingen, Germany

[73] Assignee: TRW Occupant Restraint Systems GmbH & Co. KG, Alfdorf, Germany

[21] Appl. No.: 09/180,816

[22] PCT Filed: May 20, 1997

[86] PCT No.: PCT/EP97/02563

§ 371 Date: Nov. 16, 1998

§ 102(e) Date: Nov. 16, 1998

[87] PCT Pub. No.: WO97/44217

PCT Pub. Date: Nov. 27, 1997

[30] Foreign Application Priority Data

May 20, 1996 [DE] Germany ................. 296 09 054 U

[51] Int. Cl.[7] .................................................. F01B 29/08
[52] U.S. Cl. ................................................. 60/636; 60/638
[58] Field of Search .............................. 60/632, 636, 638

[56] References Cited

U.S. PATENT DOCUMENTS

| | | | |
|---|---|---|---|
| 3,199,288 | 8/1965 | Nahas | 60/636 X |
| 5,519,997 | 5/1996 | Specht | 60/632 |
| 5,553,890 | 9/1996 | Buhr et al. | 60/632 X |
| 5,927,756 | 7/1999 | Wier | 60/632 X |
| 5,956,954 | 9/1999 | Schmid | 60/636 |

FOREIGN PATENT DOCUMENTS

| | | |
|---|---|---|
| 2494997 | 4/1982 | France . |
| 0635404 | 1/1995 | Germany . |

*Primary Examiner*—Hoang Nguyen
*Attorney, Agent, or Firm*—Tarolli, Sundheim, Covell, Tummino & Szabo L.L.P.

[57] ABSTRACT

A belt tensioner, more particularly a buckle tensioner for a vehicle occupant restraint system comprises a housing, a gas generator, a working space (15) into which the pressurized gas released in a restraint situation flows, a piston part (9) which is displaceable in the working space (15) by the pressurized gas, a belt engagement apparatus, and a traction transfer apparatus (7) which connects the belt engagement apparatus with the piston part (9). A housing-fixed deflection apparatus (21) provided in the working space guides the stream of pressurized gas away from the traction transfer apparatus (7) and prevents the pressurized gas which flows out of the gas generator from directly impinging on the traction transfer apparatus (7), with the result that the thermal stress on the traction transfer apparatus (7) is less than with conventional belt tensioners.

17 Claims, 7 Drawing Sheets

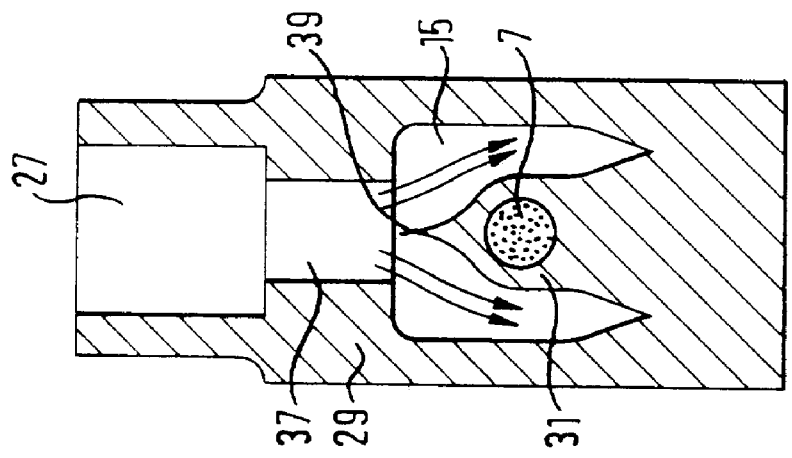
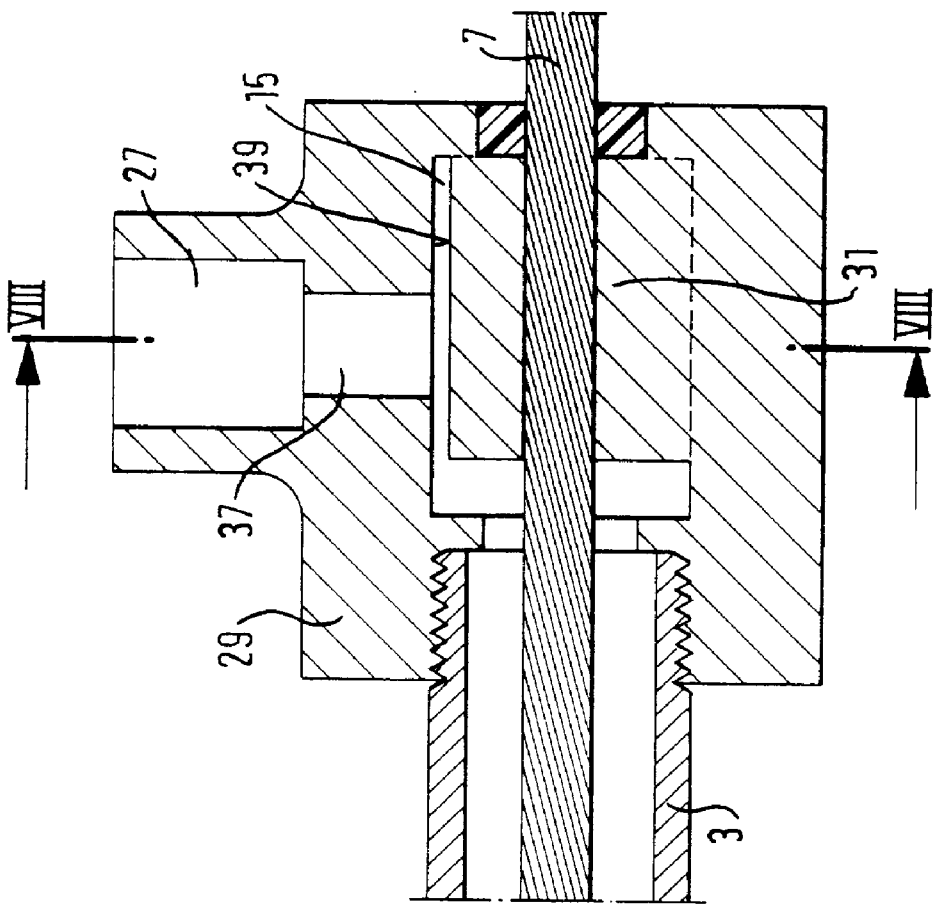

BELT TIGHTENER FOR A SAFETY BELT SYSTEM

The invention relates to a belt tensioner, more particularly a buckle tensioner for a vehicle occupant restraint system, comprising a housing, a gas generator, a working space into which the pressurized gas released in a restraint situation flows, a piston part which is displaceable in the working space by the pressurized gas, a belt engagement means in force-transmitting relationship with the buckled belt, and a traction transfer means which connects the belt engagement means with the piston part.

In a restraint situation, hot pressurized gas released by the gas generator flows into the working space to displace the piston part. The traction transfer means, normally a traction cable, is exposed in the process to high temperatures due to the immediate contact with the hot pressurized gas and may thereby be damaged. In the case of buckle tensioners, in addition to the thermal stress the traction transfer means is subjected to a high tensile load which is exercised by the vehicle occupant shifting forward. The traction transfer means has hitherto been overdimensioned to enable it to withstand the loads, which, however, makes the belt tensioner more expensive to manufacture and increases its weight.

The invention provides a belt tensioner in which the thermal stresses to which the traction transfer means is subjected are lower than in the case of belt tensioners known hitherto. This is achieved in a belt tensioner of the type mentioned at the outset in that in the working space a housing-fixed deflection means is provided which guides the stream of pressurized gas away from the traction transfer means and at least largely prevents the pressurized gas which flows out of the gas generator from directly impinging on the traction transfer means. Unlike in belt tensioners known hitherto, in the case of the belt tensioner in accordance with the invention the hot pressurized gas is prevented from directly impinging on the traction transfer means, whereas in belt tensioners known hitherto the pressurized gas stream is typically directed immediately to the traction transfer means via a radial bore, so that the high temperature—even though of short duration—in combination with a high flow rate may result in the damage to the traction transfer means as described above. Since the time period in which the hot pressurized gas flows into the working space is very short, it is sufficient to prevent the traction transfer means from being directly impinged.

The deflection means preferably guides the pressurized gas towards the housing wall at which the pressurized gas is cooled down significantly and from where it can then strike the traction transfer means without placing it under too great a thermal stress.

The deflection means need not necessarily be integrally connected as a one-piece part with the housing of the belt tensioner, it also being possible to design the deflection means as a separate part which is not displaced with the traction transfer means during the tensioning process. In accordance with a preferred embodiment, the deflection means may be a section of the gas generator housing. The gas generator housing is normally closed and is not opened until ignition of the propellant charge occurs. The pressure produced on activation causes the gas generator housing to be bent open in the fashion of a flap in the region of the section forming the deflection means, and the section projecting into the working space serves as deflection means and surrounds the traction transfer means.

Preferably, the gas generator housing is annular and is disposed in the interior of the housing of the belt tensioner. The section is formed by the end wall adjacent to the working space. The end wall may be provided with predetermined breaking lines defining sections which open like flaps upon activation of the belt tensioner. Since the end wall usually flips open radially inwards, its wall thickness is greater in radially inwardly located areas than it is in radially outer areas which are located further away from the traction transfer means.

The deflection means may also be formed by a flaring extension projecting from the gas generator housing and protruding into the working space. The extension may be provided in addition to the above-described embodiments of the deflection means or may form the deflection means by itself.

In accordance with a further embodiment the deflection means is formed by at least one protrusion on the housing of the belt tensioner, the protrusion surrounding the traction transfer means and projecting into the working space. This protrusion can be designed as a guide for the traction transfer means, thus performing a dual function. In accordance with one embodiment the protrusion is designed like a sleeve, while in another embodiment it is configured as a body which offers a low resistance to the pressurized gas stream. When the pressurized gas flows into the working space via a radial duct, the body extends from the opposite side of the housing and around the traction transfer means roughly up to the mouth of the duct, where the body tapers off to a relatively sharp edge and splits the pressurized gas into two streams of pressurized gas.

As an additional protection for the traction transfer means configured as a traction cable a sheathing may be provided which furthermore projects into the guide and rests against it. The sheathing provides for an increased sealing effect because unlike the outer surface of a traction cable which does not have a circular cylindrical form, the sheathing can be given any desired shape.

The sheathing is preferably made of a material which can not be destroyed by the flow of hot gas, and is designed as a shrinkable tube, as a traction cable coating or as a sleeve connected with the piston part.

Further features and advantages of the invention will be apparent from the following description and from the following drawings to which reference is made and in which:

FIG. 7 is a longitudinal section through the upper part of a buckle tensioner in accordance with a seventh embodiment; and FIG. 8 is a view in cross-section of the buckle tensioner along the line VIII—VIII in FIG. 7.

Figure 1:
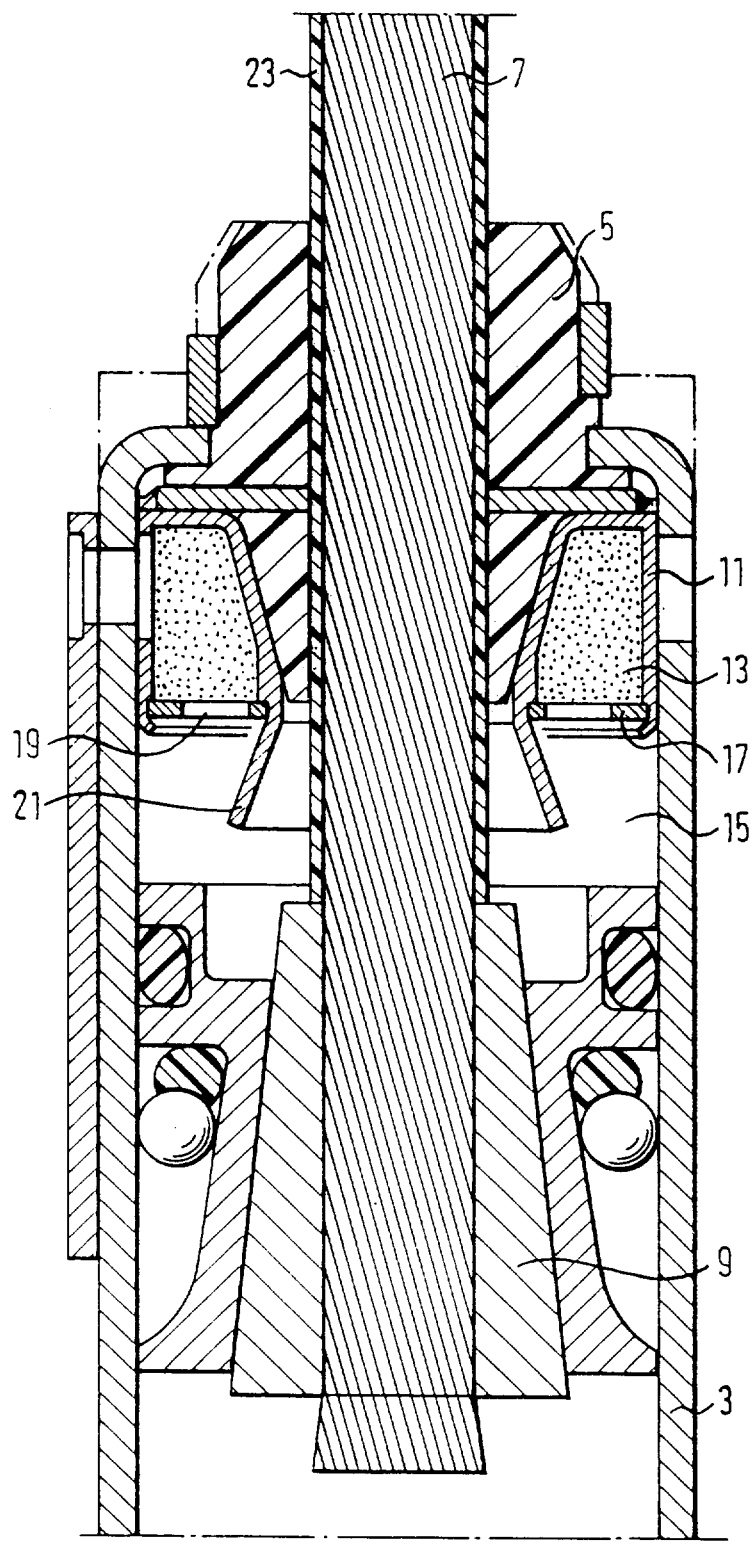
FIG. 1 is a longitudinal section through the upper part of a buckle tensioner in accordance with a first embodiment.

FIG. 1 illustrates a belt tensioner, more particularly a buckle tensioner for a safety belt system. The belt tensioner comprises a multipart housing having a tube 3 and a guide bushing 5 provided on the end face and connected to the tube 3. The guide bushing 5 has a centrical opening through which a traction transfer means 7 in the form of a traction cable extends up to a piston part 9 to which it is secured. The traction transfer means 7 connects the piston part 9 which is arranged displaceably in the interior of the tube 3 with a belt engagement means (not shown) which is in force-transmitting relationship with the buckled belt. When the belt tensioner is constructed as a buckle tensioner, the belt engagement means is the belt buckle in which an insertion tongue is locked. In the interior of the housing 3, 5 an annular gas generator is arranged which has a gas generator housing 11 in which a pyrotechnic propellant charge 13 is disposed. The propellant charge 13 is ignited in the case of restraint to produce pressurized gas which flows into a working space 15 in the belt tensioner. The end wall 17, adjoining the working space 15, of the gas generator housing 11 is designed as a separate part which is secured to the rest of the gas generator housing 11 by bending a radially inner and a radially outer edge. The end wall 17 includes a plurality of gas exit ports 19 which may be closed off by a destructible diaphragm. The gas generator housing 11 further has an extension 21 which extends from the radially inner shell section of the gas generator housing 11 into the working space 15 and forms a deflection means for the stream of pressurized gas penetrating into the working space 15 in the restraint situation. The extension 21 surrounds the traction transfer means 17 and flares like a funnel towards its free end.

The traction transfer means 7 is encased by a sheathing 23 extending from the piston part 9 to outside the belt tensioner. The sheathing 23 has a smooth outer surface and contacts the opening in the guide bushing 5, and it provides for a gas-tight seal of the working space 15. The sheathing 23 is made of a temperature-resistant material such as a special plastics which is designed so as not to be destroyed by the flow of hot pressurized gas generated. The sheathing 23 thus protects the traction transfer means 7 from thermal damage due to the hot pressurized gas.

The sheathing can be a shrinkable tube, a cable coating (a layer extruded onto the traction cable, for example) or a pressed-on sleeve.

The extension 21 serves as a deflection means preventing the hot pressurized gas from impinging directly on the sheathing 23 and the traction transfer means 7. The deflection means guides the individual streams of gas exiting through the gas exit ports 19 radially outwards so that the pressurized gas impinges on the tube 3 and the piston 9, where it is cooled down abruptly. Having assumed a low temperature, it will then impinge on the sheathing 23, with the result that the traction transfer means 7 is subjected to a substantially lower thermal stress than in conventional belt tensioners, and may be dimensioned to be weaker.

Figure 2:
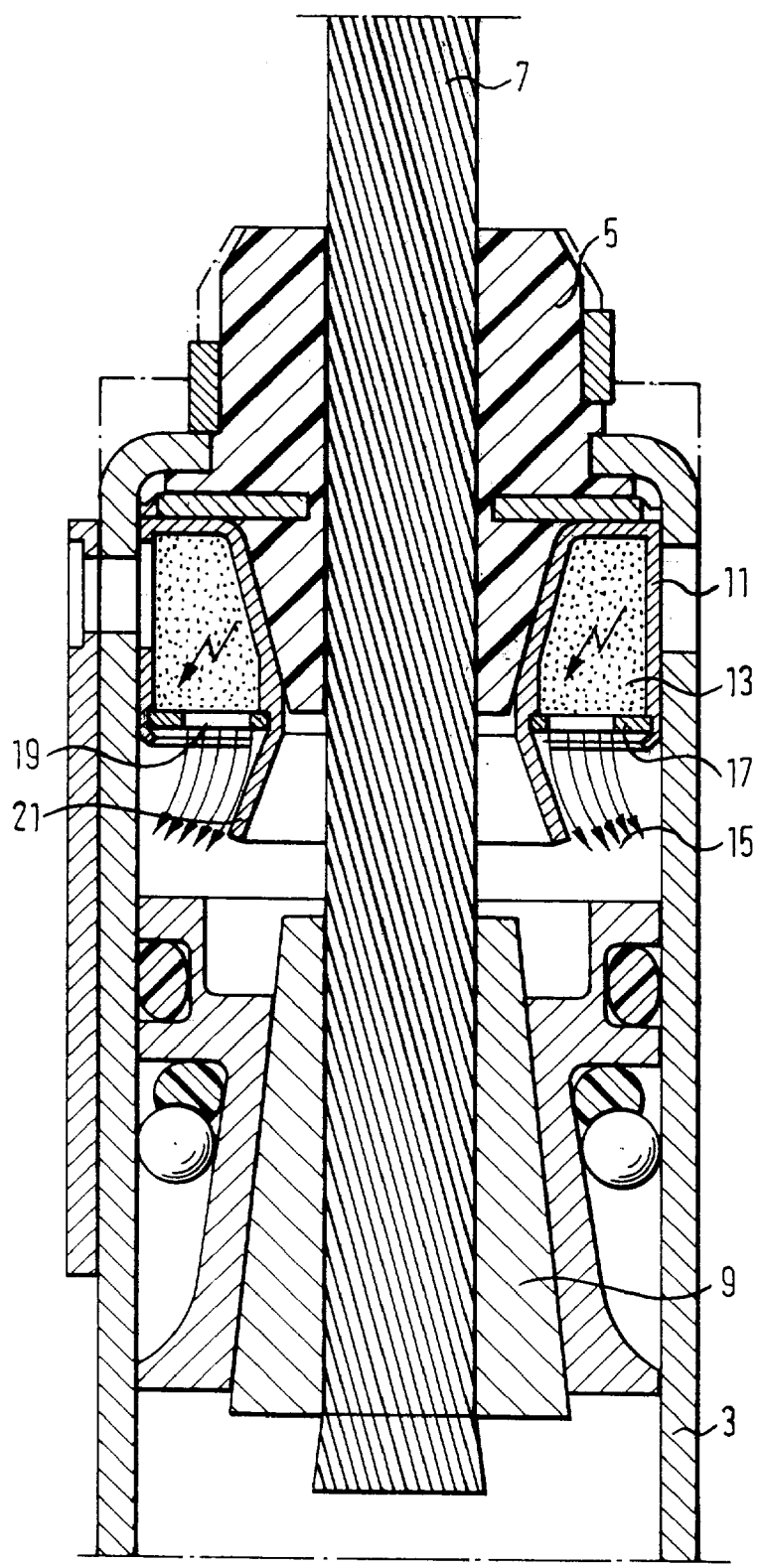
FIG. 2 is a longitudinal section through the upper part of a buckle tensioner in accordance with a second embodiment.

The embodiment illustrated in FIG. 2, which represents the point in time of the outflow of the gas, differs from that illustrated in FIG. 1 in that the sheathing 23 is absent. Otherwise, corresponding parts are provided with the same reference numerals as have been used in FIG. 1.

Figure 3:
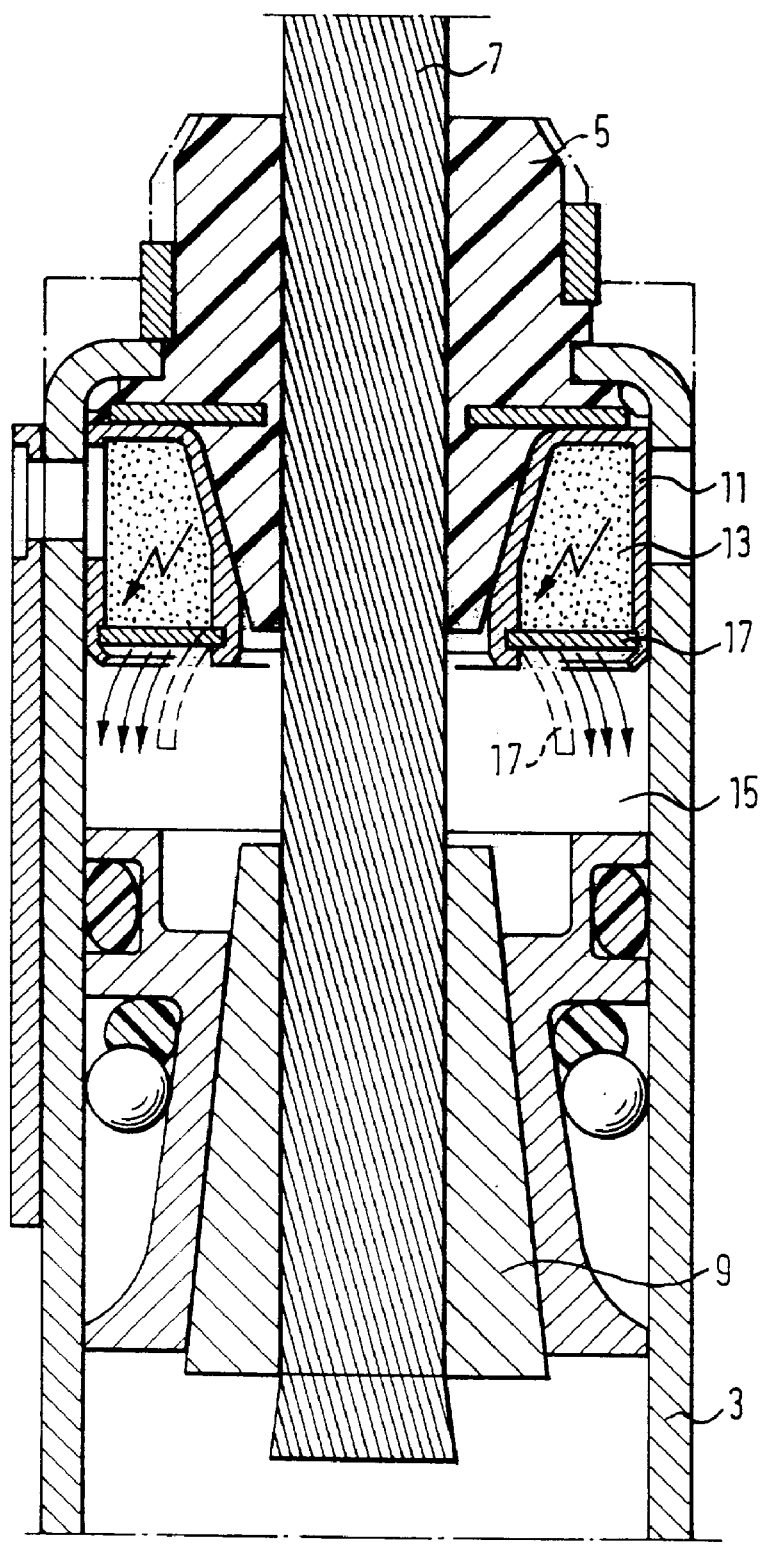
FIG. 3 is a longitudinal section through the upper part of a buckle tensioner in accordance with a third embodiment.

The embodiment illustrated in FIG. 3 differs from those described earlier in that no extension 21 is provided. The end wall 17 is fastened by its radially outer edge to the rest of the gas generator housing 11 in such a manner that the end wall 17 will be detached from the fastening on ignition of the propellant charge 13 and bent towards the working space 15, as is illustrated by broken lines. At its radially inner edge the end wall 17 will not become detached from the rest of the gas generator housing 11. The end wall 17 bent in this way constitutes the deflection means. The end wall 17 may in addition comprise predetermined breaking lines (not shown) which extend, e.g., radially, so as to facilitate opening of the gas generator housing. The end wall 17 and its attachment by its radially inner edge are designed such that the deformed end wall 17 guides the flow of pressurized gas towards the wall of the tube and in this way protects the traction transfer means 7 against direct impingement. Instead of being configured as a separate part, as in the embodiment shown in FIG. 3, the end wall 17 may also be connected to the remaining housing part 11, forming an integral one-piece unit. Preferably, the end wall is made to be thinner in the radially outer region than in the radially inner region, for it to open from the outside inwards. The section formed by the end wall 17 of the gas generator housing thus opens like a flap.

Figure 4:
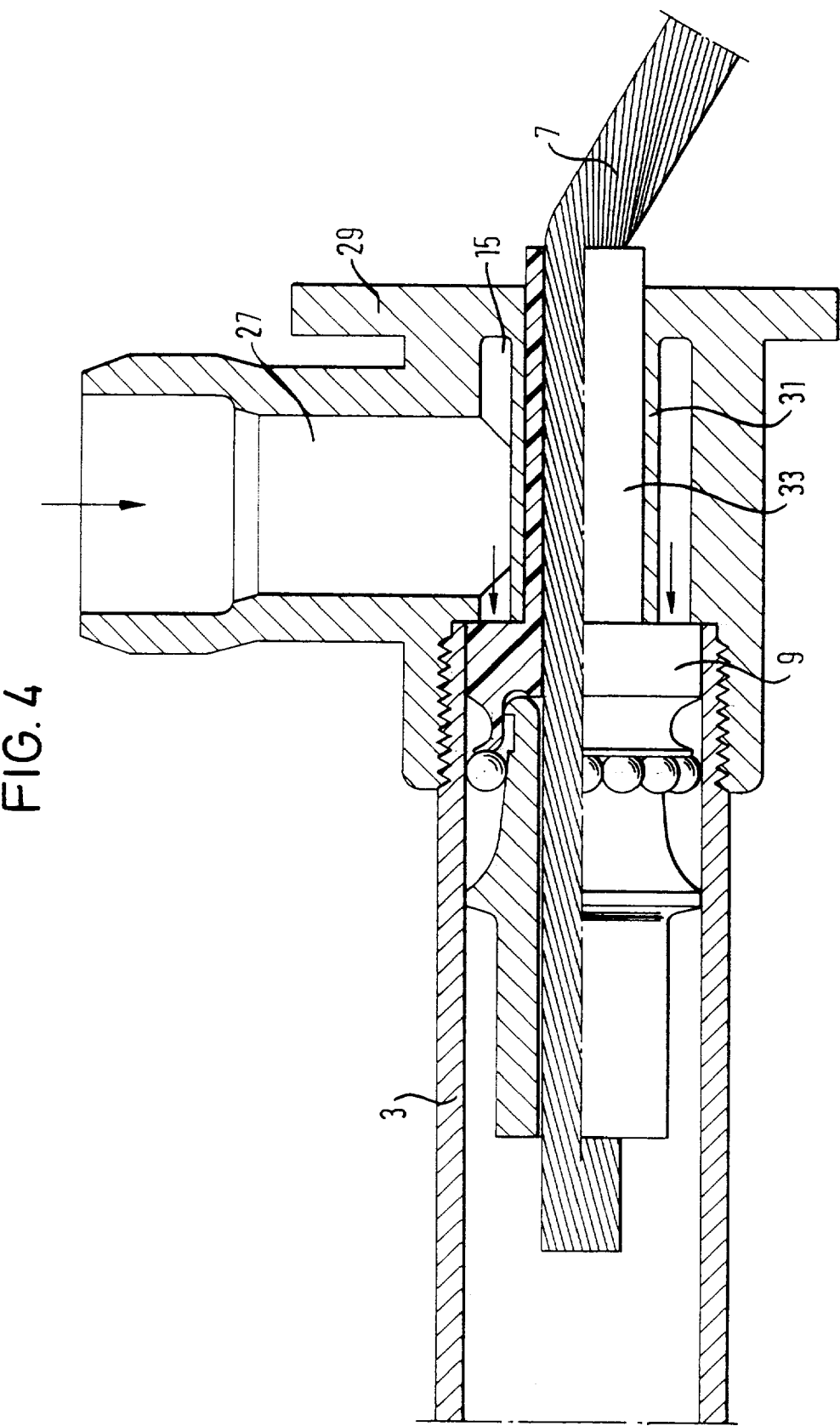
FIG. 4 is a longitudinal section through the upper part of a buckle tensioner in accordance with a fourth embodiment in which, in contrast to the embodiments of FIGS. 1 to 3, the gas generator is arranged outside the working space.

In the embodiment illustrated in FIG. 4 the gas generator is not disposed in the interior of the tube 3, but in a radially extending chamber 27 in a housing part 29 which is screwed on the tube 3 and seals the interior of the tube 3 against the outside. The working space 15 has a section located in the interior of the tube 3 and a section connected thereto projecting into the housing part 29. In the non-actuated position the piston part 9 extends directly up to that section of the working space 15 which is located in the housing part 29. While not shown in this embodiment, the gas generator has a cartridge-like housing and is introduced into the chamber 27 in the direction as shown by the arrow. In order that the pressurized gas flowing into the working space 15 in the radial direction does not directly impinge on the traction transfer means 7, the housing part 29 has an elongate, sleeve-like protrusion 31 integral therewith which projects into the working space 15 and serves at the same time as a guide for the traction transfer means. The working space 15 has an annular shape in the region of the housing part 29. To provide a greater sealing effect and an improved guidance, the traction transfer means 7 is surrounded by a sleeve 33 which is made of a temperature-resistant plastics and is formed integrally with the piston part 9. In the case of restraint, the protrusion 31 guides the pressurized gas around the traction transfer means 7 and towards the tube 3 in the direction of the arrows. When the piston part 9 is displaced, the pressurized gas will not come into direct contact with the traction transfer means 7 owing to the sleeve 33, with the result that the traction transfer means 7 is protected against thermal stress.

Figure 5:
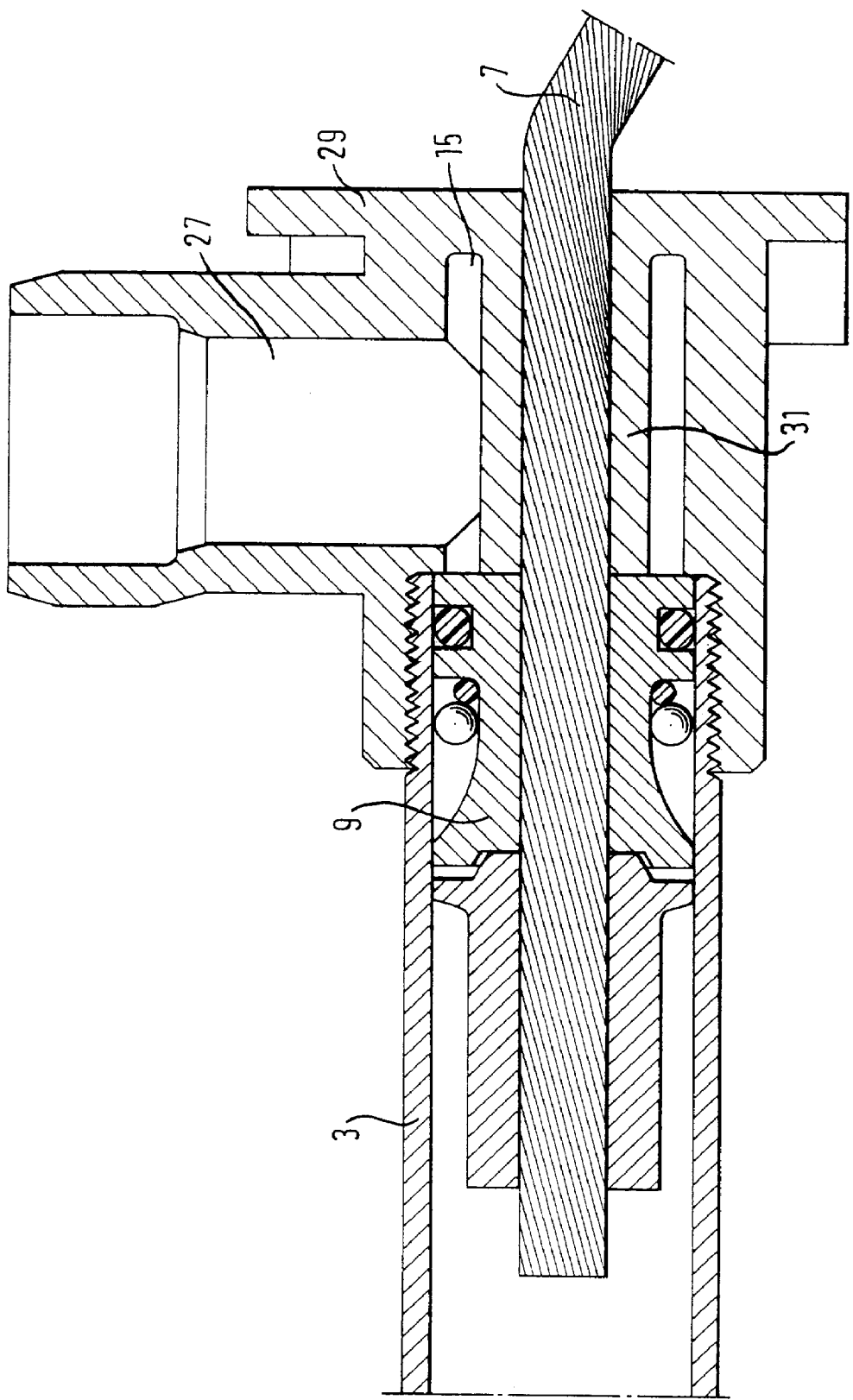
FIG. 5 is a longitudinal section through the upper part of a buckle tensioner in accordance with a fifth embodiment, which compared with the one shown in FIG. 4 is slightly modified.

In the embodiment illustrated in FIG. 5, the piston part 9 does not have a sleeve 33 arranged thereon. However, the protrusion 31 protects the traction transfer means 7 from direct contact with the pressurized gas and guides the pressurized gas onto the piston 9 in a direction parallel to the traction transfer means 7.

Figure 6:
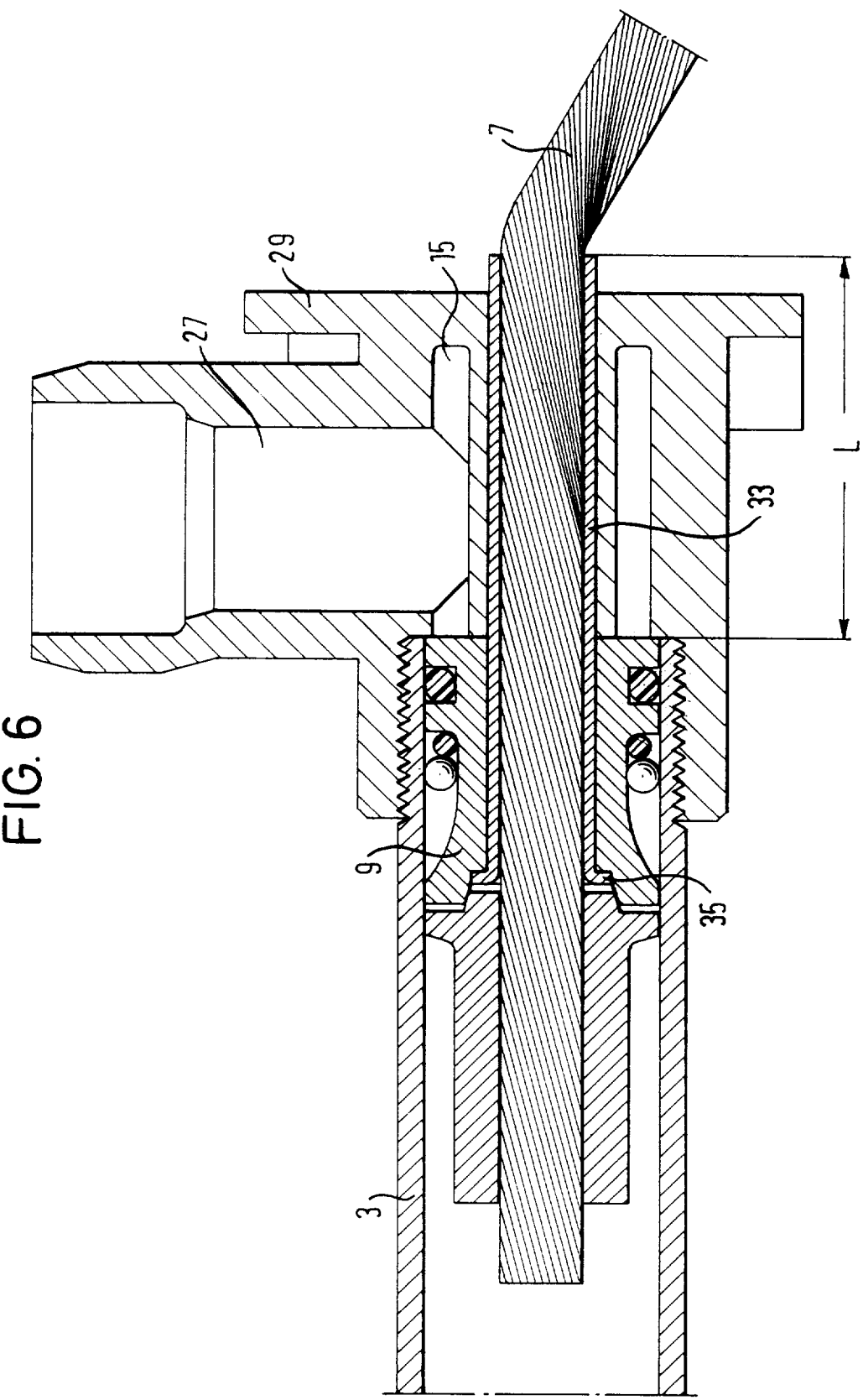
FIG. 6 is a longitudinal section through the upper part of a buckle tensioner which is slightly modified compared with the embodiments shown in FIGS. 4 and 5 and forms a sixth embodiment.

In the embodiment illustrated in FIG. 6, the sleeve 33 is configured as a separate part pressed on the traction transfer means 7, rather than as a part integrally connected with the piston 9 as one piece. The sleeve 33 extends through the piston part 9 and has an end 35 bent outwards which ensures that the sleeve 33 is entrained when the piston 9 is displaced. L designates the length of guidance of the traction transfer means 7 in the housing part 29. Since the length L of guidance is very long, a considerable sealing effect can be achieved.

In the embodiment illustrated in FIGS. 7 and 8, a radially extending duct 37 is provided between the chamber 27 and the working space 15. The pressurized gas flows into the working space 15 via the duct 37. In this embodiment the protrusion 31 extends from the housing part 29 in the region diametrically opposed to the duct 37 and around the traction transfer means 7 on either side, up to where the duct 37 opens into the working space 15, and tapers off forming an edge 39, so that the flow of gas is divided and guided around the traction transfer means 7 and eventually flows into the tube 3. The protrusion 31 can be integrally connected as one piece with the housing part 29, or can be designed as a separate part. Depending on the embodiment, it can also serve as a guide for the traction transfer means 7 and can have a sealing function.

What is claimed is:

1. A belt tensioner, for use as a buckle tensioner for a vehicle occupant restraint system, comprising a housing (3, 5) having a cylindrical housing wall, a gas generator, a working space (15) which is defined in the radial direction by the housing wall and into which the pressurized gas released in a restraint situation flows, a piston part (9) which is displaceable in the working space (15) by the pressurized gas, a belt engagement means in force-transmitting relationship with the buckled belt, and a traction transfer means (7) which connects the belt engagement means with the piston part (9), a housing-fixed deflection means for deflecting the stream of pressurized gas being provided in the working space (15), characterized in that the deflection means is adapted to guide the stream of pressurized gas radially obliquely outwards away from the traction transfer means (7) and towards the housing wall, in this way preventing the pressurized gas which flows out of the gas generator from directly impinging on the traction transfer means (7).

2. The belt tensioner as set forth in claim 1, characterized in that the traction transfer means (7) is a traction cable.

3. The belt tensioner as set forth in claim 1, characterized in that the gas generator comprises a gas generator housing (11, 17) and the deflection means is formed by a section of the gas generator housing (17).

4. The belt tensioner as set forth in claim 3, characterized in that the gas generator housing (11) is opened on activation of the belt tensioner and that the gas generator housing (11) is bent open in the region of the section forming the deflection means and the section surrounds the traction transfer means (7).

5. The belt tensioner as set forth in claim 3, characterized in that the gas generator housing (11) is annular and is disposed in the interior of the housing, and that the section is formed by the end wall (17) adjacent to the working space (15).

6. The belt tensioner as set forth in claim 5, characterized in that the end wall is provided with predetermined breaking lines defining sections which open like flaps on activation of the belt tensioner.

7. The belt tensioner as set forth in claim 5, characterized in that the end wall (17) is designed as a separate part.

8. The belt tensioner as set forth in claim 1 claims, characterized in that the deflection means has a flaring extension (21) projecting from the gas generator housing (11) and protruding into the working space (15).

9. The belt tensioner as set forth in claim 1, characterized in that the deflection means is formed by at least one protrusion (31) on the housing of the belt tensioner, the protrusion (31) surrounding the traction transfer means (7) and projecting into the working space (15).

10. The belt tensioner as set forth in claim 9, characterized in that the housing comprises a chamber (27) provided laterally of the working space (15) and in fluid communication with the working space (15), the gas generator being disposed in the chamber (27).

11. The belt tensioner as set forth in claim 10, characterized in that the pressurized gas flows into the working space (15) from the side and that the protrusion (31) extends from a region of the housing (29) located diametrically opposed to the mouth of the pressurized gas stream flowing into the working space (15) towards the traction transfer means (7), and extends around the traction transfer means (7) towards the mouth.

12. The belt tensioner as set forth in claim 11, characterized in that the protrusion (31) tapers off towards the mouth forming a relatively sharp edge and guides the stream of pressurized gas around the traction transfer means (7).

13. The belt tensioner as set forth in claim 10, characterized in that the protrusion (31) is designed like a sleeve and serves as a guide for the traction transfer means (7).

14. The belt tensioner as set forth in claim 1, characterized in that the traction transfer means (7) is a traction cable having a sheathing (23) which projects into the guide and rests against it.

15. The belt tensioner as set forth in claim 14, characterized in that the sheathing (23) is made of a material which can not be destroyed by the stream of hot pressurized gas and is designed

- as a shrinkable tube,
- as a traction cable coating or
- as a sleeve (33).

16. The belt tensioner as set forth in claim 15, characterized in that the sleeve (33) is connected with the piston part (9).

17. The belt tensioner as set forth in claim 15, characterized in that the sheathing (23) is made of plastics.

* * * * *